(12) United States Patent
Hamada et al.

(10) Patent No.: US 9,416,678 B2
(45) Date of Patent: Aug. 16, 2016

(54) STEAM VALVE

(71) Applicant: MITSUBISHI HITACHI POWER SYSTEMS, LTD., Kanagawa (JP)

(72) Inventors: Katsuhisa Hamada, Tokyo (JP); Kensuke Futahashi, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 14/890,282

(22) PCT Filed: Dec. 27, 2013

(86) PCT No.: PCT/JP2013/085238
§ 371 (c)(1),
(2) Date: Nov. 10, 2015

(87) PCT Pub. No.: WO2014/199534
PCT Pub. Date: Dec. 18, 2014

(65) Prior Publication Data
US 2016/0102575 A1    Apr. 14, 2016

(30) Foreign Application Priority Data

Jun. 13, 2013   (JP) .................................. 2013-124835

(51) Int. Cl.
*F16K 1/54* (2006.01)
*F01D 17/26* (2006.01)
(Continued)

(52) U.S. Cl.
CPC . *F01D 17/26* (2013.01); *F16K 1/36* (2013.01); *F16K 1/42* (2013.01); *F16K 1/54* (2013.01); *F05D 2220/31* (2013.01)

(58) Field of Classification Search
CPC ............. F01D 17/26; F16K 1/36; F16K 1/42; F16K 1/54; F05D 2220/31
USPC ......................... 251/333, 120–121
See application file for complete search history.

(56) References Cited

U.S. PATENT DOCUMENTS 2,333,455 A * 11/1943 Warren .................... F16K 29/00
137/630.14
3,773,085 A * 11/1973 Caldwell, Jr. ........... F16K 47/04
137/625.3

(Continued)

FOREIGN PATENT DOCUMENTS

GB      2 295 659        6/1996
JP      60-208684       10/1985

(Continued)

OTHER PUBLICATIONS

International Search Report issued Mar. 11, 2014 in corresponding International Application No. PCT/JP2013/085238.

(Continued)

*Primary Examiner* — John Bastianelli
(74) *Attorney, Agent, or Firm* — Wenderoth, Lind & Ponack, L.L.P.

(57) ABSTRACT

In a steam valve, a seat-side convexly curved surface (35b) of a valve body (30) is configured such that the average radius of curvature Rv from a starting end portion (35c) on the upstream side in a flow direction of steam to a termination end portion (35a) has a relationship of Rv<Rs with respect to the radius of curvature Rs of a valve-seat-side convexly curved surface (26a); the seat-side convexly curved surface (35b) is formed with an upstream-side curved surface (36) and a downstream-side curved surface (37); the seat-side convexly curved surface (35b) has an abutting area (35s) abutting a valve seat portion (26); and the radius of curvature R1 of the downstream-side curved surface (37) has a relationship of Rs<R1 with respect to the radius of curvature Rs in the flow direction of the steam.

6 Claims, 3 Drawing Sheets

(51) Int. Cl.
  *F16K 1/36* (2006.01)
  *F16K 1/42* (2006.01)

(56) References Cited

U.S. PATENT DOCUMENTS

| | | | | |
|---|---|---|---|---|
| 4,269,227 | A | * | 5/1981 | Araki .................. F16K 1/44 137/630.14 |
| 4,688,755 | A | * | 8/1987 | Pluviose ............. F01D 17/145 138/44 |
| 5,318,270 | A | | 6/1994 | Detanne et al. |
| 5,533,548 | A | * | 7/1996 | Grant .................. F16K 17/0466 137/540 |
| 7,108,244 | B2 | * | 9/2006 | Hardin ................ F16K 1/34 251/120 |
| 7,931,252 | B2 | * | 4/2011 | Shindo ................ F16K 1/34 251/318 |
| 2009/0101859 | A1 | | 4/2009 | Ooishi et al. |
| 2011/0297867 | A1 | | 12/2011 | Chowdhury et al. |

FOREIGN PATENT DOCUMENTS

| | | |
|---|---|---|
| JP | 61-248968 | 11/1986 |
| JP | 9-210244 | 8/1997 |
| JP | 9-296869 | 11/1997 |
| JP | 10-299909 | 11/1998 |
| JP | 10-299910 | 11/1998 |
| JP | 2006-63957 | 3/2006 |
| JP | 4185029 | 11/2008 |
| JP | 2010-270900 | 12/2010 |
| JP | 2011-252437 | 12/2011 |

OTHER PUBLICATIONS

Written Opinion of the International Searching Authority issued Mar. 11, 2014 in corresponding International Application No. PCT/JP2013/085238.

Notice of Allowance issued Apr. 29, 2016 in corresponding Korean Application No. 10-2015-7031789 (with English Translation).

Notice of Allowance issued May 10, 2016 in corresponding Japanese Application No. 2013-124835 (with English Translation).

Extended European Search Report issued May 10, 2016 in corresponding European Application No. 13886825.2.

* cited by examiner

STEAM VALVE

TECHNICAL FIELD

The present invention relates to a steam valve which is provided in a steam pipeline of a steam turbine or the like.

Priority is claimed on Japanese Patent Application No. 2013-124835, filed Jun. 13, 2013, the content of which is incorporated herein by reference.

BACKGROUND ART

In a steam pipeline of a steam turbine or the like which is provided in a power generation facility or the like, a steam valve for adjusting the flow rate of steam which is supplied or stopping the supply of the steam is provided.

The steam valve is provided with a casing with a flow path for steam formed therein, and a valve body movably provided in the flow path. A valve seat capable of being blocked by the valve body is formed in the flow path of the casing. The valve body is driven, thereby coming close to and being separated from the valve seat. In this way, a steam flow rate is adjusted by changing the flow path area of the gap between the valve body and the valve seat.

Incidentally, in such a steam valve, vibration or noise is generated due to a drift, a swirling current, or the like of high-pressure steam. For this reason, in order to reduce vibration or noise which is generated, improvement of the shape of the valve body or the valve seat of the steam valve is performed.

For example, PTL 1 discloses a steam valve in which the radius of curvature of a valve body is set to be in a range of 0.52 to 0.6 times the diameter (a seat diameter) of a portion where the valve body and a valve seat come into contact with each other and the radius of curvature of the valve seat is set to be greater than 0.6 times the seat diameter. According to this steam valve, a state where a streamline of steam is along a movement direction of the valve body is created, and thus a steam stream becomes stable, whereby it is possible to reduce vibration or noise of each portion of the steam valve.

Further, PTL 2 discloses a steam valve having a tapered surface inclined further toward the relative movement direction side of a valve body with respect to a valve seat than a valve head portion, on the upstream side of the valve head portion. According to this steam valve, the tapered surface inclined further toward the valve body movement direction side than the valve head portion is provided on the upstream side of the valve head portion, and therefore, before steam passes through the flow path between the valve seat and the valve body, the steam is guided by the tapered surface so as to head toward the valve seat movement direction. For this reason, it is possible to reduce vibration of each portion of the steam valve.

CITATION LIST

Patent Literature

[PTL 1] Japanese Patent No. 4185029
[PTL 2] Japanese Unexamined Patent Application, First Publication No. 2011-252437

SUMMARY OF INVENTION

Technical Problem

Incidentally, in a slightly open state where the gap between a valve body and a valve seat is narrow, a flow in which steam is along the valve body is created, and thus disturbance of a steam stream is directly transmitted to the valve body. For this reason, self-excited vibration is generated in the valve body and noise is also generated. As described above, although a reduction in vibration or noise is realized in the related art, further improvement capable of reducing vibration or noise, in particular, even if a steam valve is in the slightly open state, is required.

The present invention has an object to provide a steam valve in which it is possible to further reduce noise or vibration.

Solution to Problem

According to a first aspect of the present invention, there is provided a steam valve which is provided with a casing with a steam flow path formed therein, and a valve body disposed in the steam flow path and provided so as to be capable of moving relative to the steam flow path. The steam valve includes: a valve seat portion which is formed in the steam flow path and provided with a valve-seat-side convexly curved surface having a cross-sectional area gradually increasing toward a downstream side in a flow direction of steam in the steam flow path; and a seat portion which is formed in the valve body and has, at a site facing the valve seat portion, a seat-side convexly curved surface having an outer diameter gradually increasing toward the downstream side from an upstream side in the flow direction of the steam. In the seat-side convexly curved surface, an average radius of curvature $Rv$ in the flow direction of the steam from a starting end portion on the upstream side in the flow direction of the steam to a termination end portion on the downstream side in the flow direction of the steam has a relationship of $Rv<Rs$ with respect to a radius of curvature $Rs$ in the flow direction of the valve-seat-side convexly curved surface. The seat-side convexly curved surface is provided with an upstream-side curved surface on the upstream side in the flow direction of the steam, and a downstream-side curved surface on the downstream side in the flow direction of the steam, and the upstream-side curved surface and the downstream-side curved surface have radii of curvature different from each other. The downstream-side curved surface has an abutting area abutting the valve seat portion. A radius of curvature $R1$ of the downstream-side curved surface that extends in the flow direction of the steam has a relationship of $Rs<R1$ with respect to the radius of curvature $Rs$ in the flow direction of the steam.

According to a second aspect of the present invention, there is provided the steam valve in which the valve body in the steam valve according to the first aspect may be provided with a tapered portion which is continuously formed from the termination end portion of the seat portion and formed at the downstream side of the seat portion in the flow direction and which has an outer diameter which is gradually reduced.

According to a third aspect of the present invention, there is provided the steam valve in which in the steam valve according to the first or second aspect, a radius of curvature $R2$ of the upstream-side curved surface that extends in the flow direction of the steam, the radius of curvature $R1$ of the downstream-side curved surface, and the average radius of curvature $Rv$ of the seat portion may have a relationship of $R2<Rv<Rs<R1$ with respect to the radius of curvature $Rs$ of the valve seat portion.

According to a fourth aspect of the present invention, there is provided the steam valve in which the seat portion in the steam valve according to any one of the first to third aspects may have a relationship in which a diameter $Ds$ of the abutting area of the seat portion with respect to a center of the valve body and a diameter Dout of the termination end portion of the seat portion is $1.02 \leq Dout/Ds \leq 1.03$.

According to a fifth aspect of the present invention, there is provided the steam valve in which the seat portion in the steam valve according to any one of the first to fourth aspects may have a relationship in which the diameter Ds of the abutting area of the seat portion and a diameter Din of the starting end portion of the seat portion is $Din/Ds \leq 0.75$.

According to a sixth aspect of the present invention, there is provided the steam valve in which the seat portion in the steam valve according to any one of the first to fifth aspects may have a relationship in which the diameter Ds of the abutting area of the seat portion and an inner diameter Dt of the steam flow path on the upstream side in the flow direction with respect to the valve seat portion is $1.15 \leq Ds/Dt \leq 1.25$.

Advantageous Effects of Invention

According to the steam valve according to the present invention, it becomes possible to further reduce noise or vibration.

DESCRIPTION OF EMBODIMENTS

Hereinafter, a mode for carrying out a steam valve according to the present invention will be described with reference to the accompanying drawings.

Figure 1:
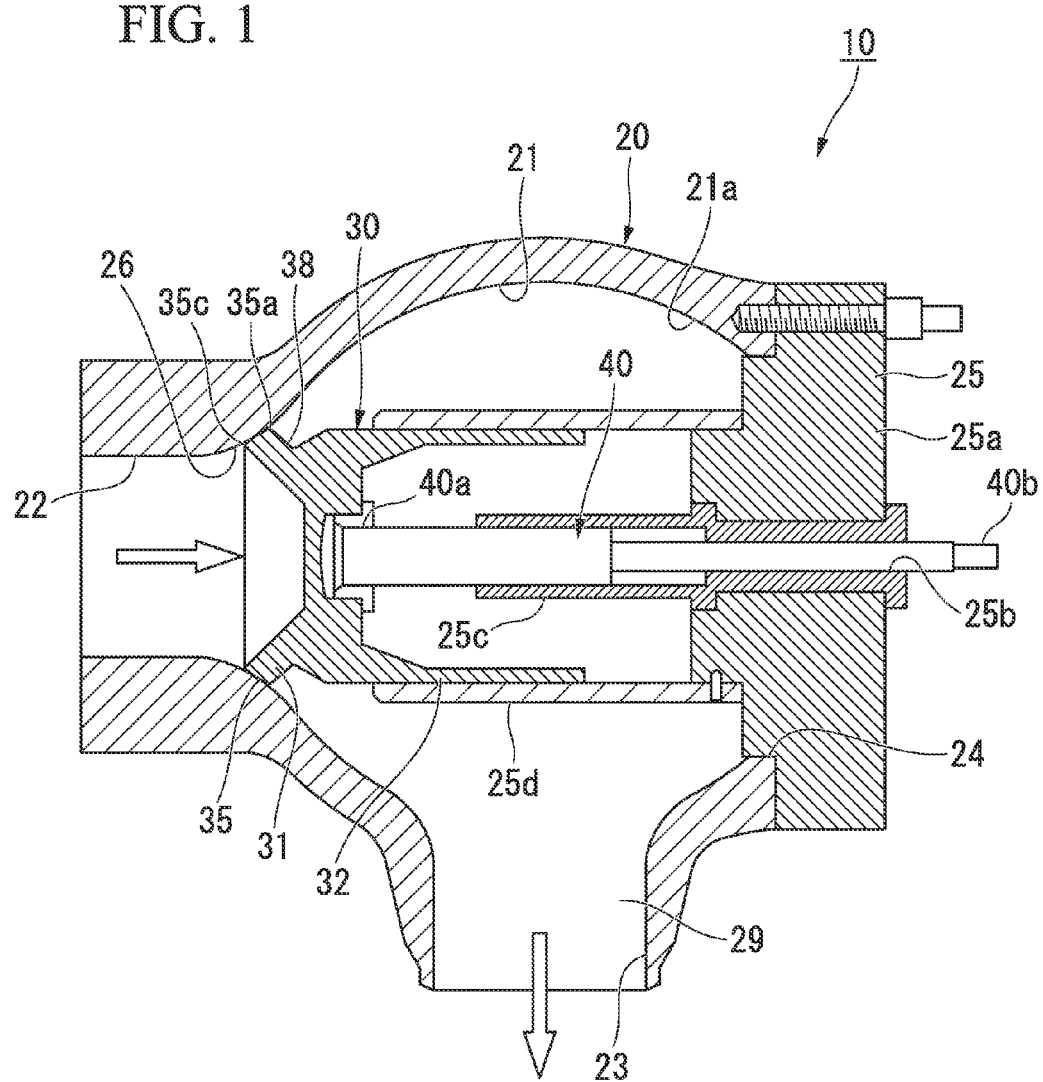
FIG. 1 is a sectional view showing the overall configuration of a steam valve.
Figure 2:
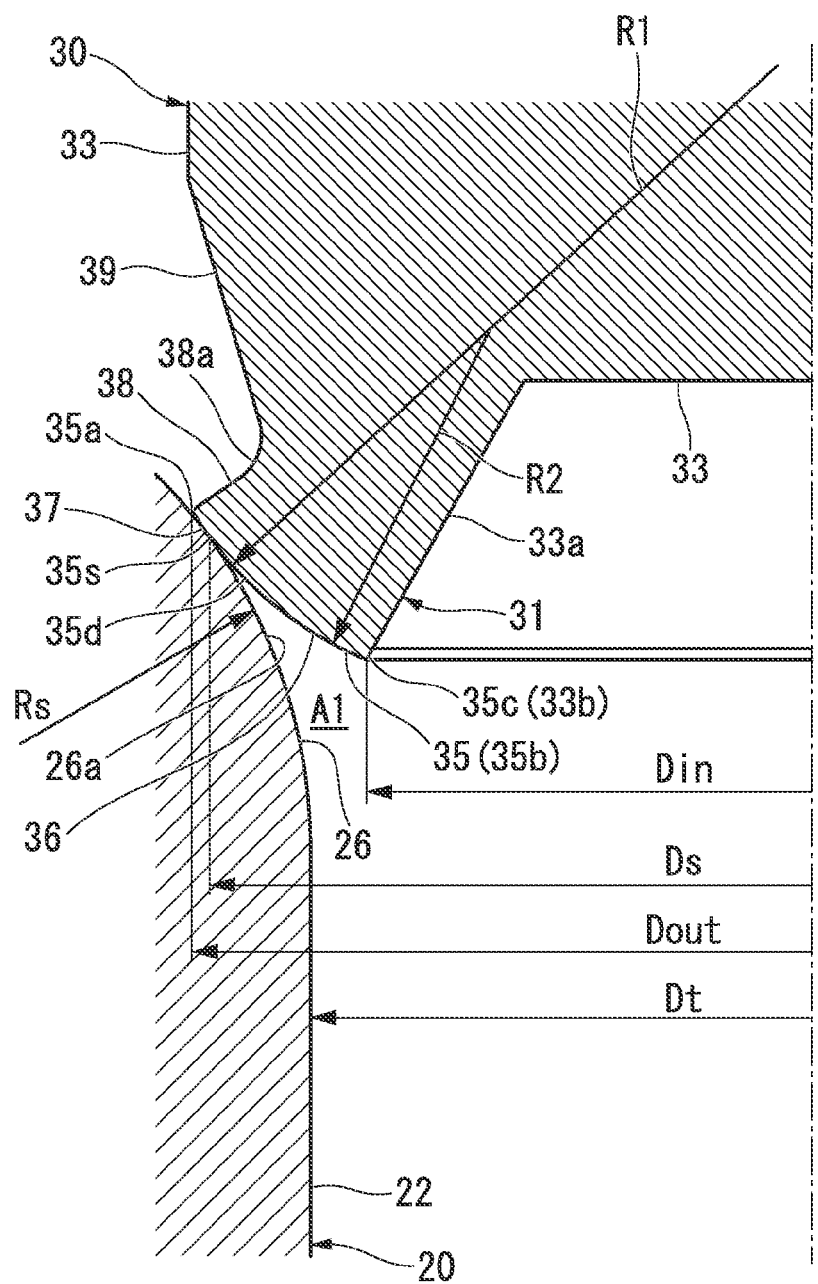
FIG. 2 is an enlarged sectional view showing the shapes of a valve head portion and a valve seat portion of a valve body.
Figure 3:
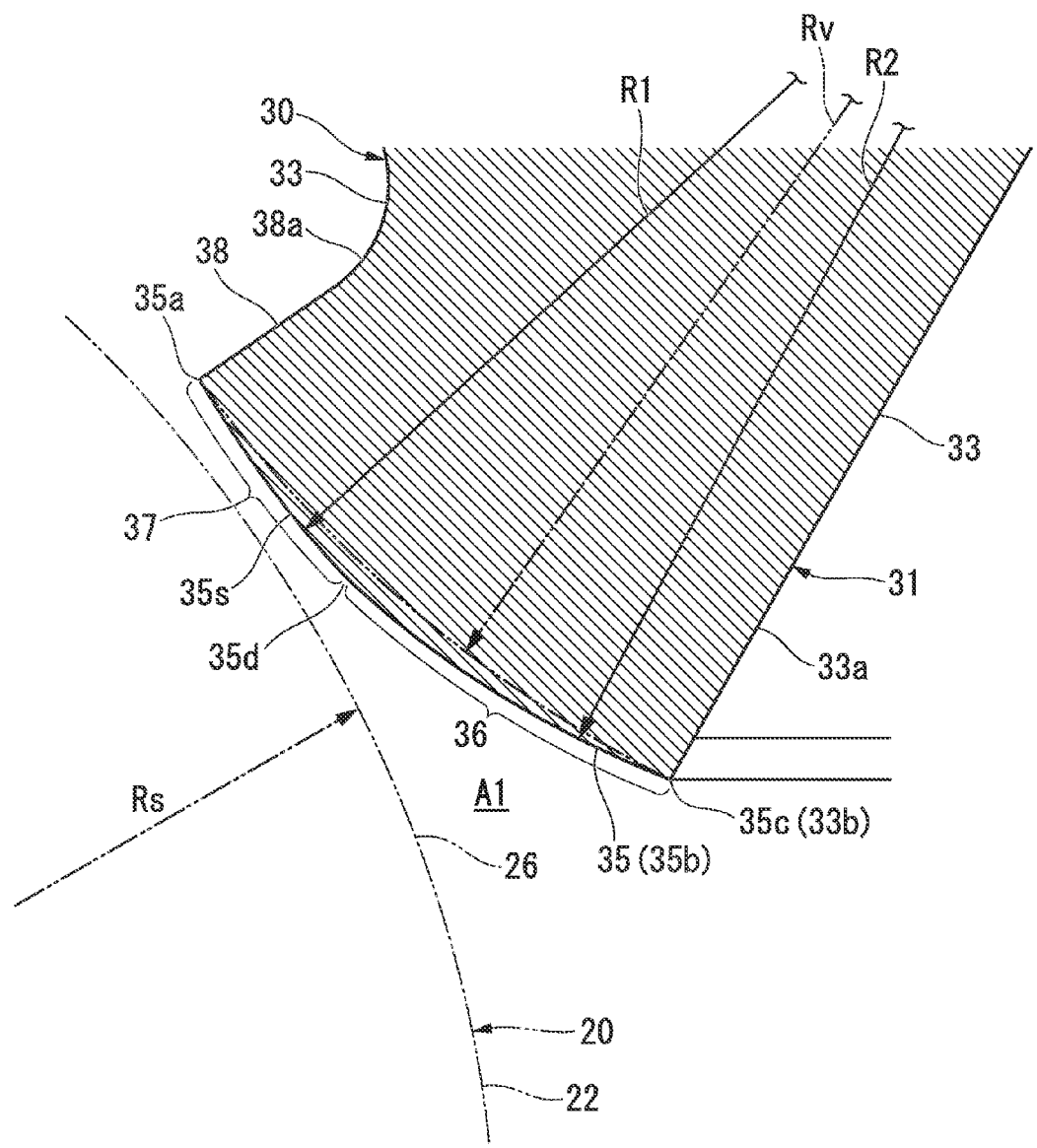
FIG. 3 is an enlarged sectional view of a seat portion of the valve body.

FIG. 1 is a sectional view showing the overall configuration of a steam valve. FIG. 2 is an enlarged sectional view showing the shapes of a valve head portion 31 and a valve seat portion 26 of a valve body 30. FIG. 3 is an enlarged sectional view of a seat portion 35 of the valve body 30.

As shown in FIG. 1, a steam valve 10 is provided in a steam pipeline of a steam turbine which is provided in a power generation facility or the like. The steam valve 10 is mainly provided with a casing 20, the valve body 30, and a valve shaft 40.

The casing 20 is provided with a valve chamber 21, an inflow port 22, an outflow port 23, and an opening portion 24.

The valve chamber 21 accommodates the valve body 30 therein. The inflow port 22 and the outflow port 23 communicate with the valve chamber 21. The opening portion 24 faces the inflow port 22 with the valve chamber 21 interposed therebetween.

As shown by an arrow in FIG. 1, steam flows into the inflow port 22 and flows out of the outflow port 23.

An inner peripheral surface 21a of the valve chamber 21 has a substantially concave spherical shape. The valve body 30 is provided in the valve chamber 21 so as to be able to reciprocate in one direction.

The inflow port 22 is formed to have a circular cross section. The inflow port 22 has an inner diameter smaller than the inner diameter of the valve chamber 21. Steam piping (not shown) or the like is connected to the inflow port 22. The valve seat portion 26 is formed over the inner peripheral surface 21a of the valve chamber 21 from the inflow port 22. The valve seat portion 26 has an inner diameter (a cross-sectional area) which gradually expands toward the downstream side in a flow direction of the steam. The valve seat portion 26 has a curved surface (a valve-seat-side convexly curved surface) 26a which is convex toward the inside of the valve chamber 21.

The outflow port 23 is formed to be open laterally with respect to a direction connecting the inflow port 22 and the opening portion 24. The outflow port 23 is formed to have an inner diameter smaller than the inner diameter of the valve chamber 21. Steam piping (not shown) is connected to the outflow port 23.

In this way, a steam flow path 29 which is continuous from the inflow port 22 to the outflow port 23 through the valve chamber 21 is formed in the casing 20.

A holding member 25 is mounted in the opening portion 24. The holding member 25 blocks the opening portion 24 and holds the valve body 30. The holding member 25 is provided with a base portion 25a, a valve shaft insertion hole 25b, a valve shaft holding cylinder 25c, and a valve body holding cylinder 25d.

The base portion 25a blocks the opening portion 24. The valve shaft insertion hole 25b is formed in a central portion of the base portion 25a. The valve shaft holding cylinder 25c is provided on the outer periphery side of the valve shaft insertion hole 25b and formed as a cylinder extending toward the inflow port 22 from the base portion 25a. The valve body holding cylinder 25d is provided on the outer periphery side of the valve shaft holding cylinder 25c and formed in the form of a cylinder extending toward the inflow port 22 from the base portion 25a.

The valve body 30 is provided with the valve head portion 31 and a skirt portion 32. The valve head portion 31 is provided so as to be able to block the valve seat portion 26. The skirt portion 32 extends toward the opening portion 24 side from an outer peripheral portion of the valve head portion 31. The skirt portion 32 is formed as of a cylinder inserted into the valve body holding cylinder 25d of the holding member 25.

The valve shaft 40 is fixed to a central portion of the valve head portion 31 at a leading end portion 40a thereof. The valve shaft 40 has an axis line in the direction connecting the inflow port 22 and the opening portion 24. The valve shaft 40 is inserted into the valve shaft holding cylinder 25c. A rear end portion 40b of the valve shaft 40 protrudes to the outside of the steam valve 10 through the valve shaft insertion hole 25b of the holding member 25. An actuator (not shown) is connected to the rear end portion 40b of the valve shaft 40. It becomes possible to move the valve shaft 40 in a direction of the axis line thereof by the actuator. By the movement of the valve shaft 40 by the actuator, the valve body 30 is moved in the steam flow path 29 in a direction toward and away from the valve seat portion 26.

The valve body 30 is made so as to be switched between a fully closed state, a slightly open state, and an open state. Here, the fully closed state is a state where the valve head portion 31 blocks the valve seat portion 26 by making the seat portion 35 of the outer peripheral portion of the valve head portion 31 abut the valve seat portion 26. The slightly open state is a state where the valve head portion 31 has moved from the valve seat portion 26 to the opening portion 24 side such that an annular flow path is formed between the valve seat portion 26 and the seat portion 35. The open state is a state where the valve head portion 31 has moved further from the slightly open state to the opening portion 24 side.

In a case where the valve body 30 is in the slightly open state or the open state, the steam having been introduced from the inflow port 22 of the steam valve 10 into the valve chamber 21 through the annular flow path flows out of the valve chamber 21 through the outflow port 23, thereby being supplied to a steam turbine (not shown) or the like disposed at a subsequent stage of the steam valve 10.

In this manner, in the steam valve 10, it is possible to appropriately adjust a steam flow rate by increasing or decreasing the cross-sectional area of the annular flow path according to the movement amount (the lift amount) of the valve body 30 from the fully closed state.

Next, the shape of the valve head portion 31 in the steam valve 10 of this embodiment described above will be described.

As shown in FIGS. 2 and 3, the valve head portion 31 has a concave portion 33 on the side facing the inflow port 22 (the upstream side in the flow direction of the steam). The concave portion 33 has, at an outer peripheral portion thereof, a tapered surface 33a having an inner diameter which gradually reduces with increasing distance from the inflow port 22 side.

In the valve head portion 31, the seat portion 35 is formed on the outer periphery side of an outer peripheral edge portion 33b of the tapered surface 33a. The seat portion 35 has, at a site facing the valve seat portion 26, an outer diameter which gradually expands toward the downstream side from the upstream side in the flow direction of the steam. In the valve head portion 31, a tapered portion 38 is formed on the downstream side in the flow direction of the steam continuously to an outer periphery-side end portion (a termination end portion) 35a of the seat portion 35. The tapered portion 38 is substantially orthogonal to the seat portion 35 and has an outer diameter which gradually reduces with increasing distance from the inflow port 22 side. An enlarged diameter portion 39 is formed continuously to an inner periphery-side end portion 38a of the tapered portion 38. The enlarged diameter portion 39 has an outer diameter which gradually expands with increasing distance from the inflow port 22 side until it becomes equal to the outer diameter of the outer periphery-side end portion 35a of the seat portion 35.

Here, the seat portion 35 is provided with a curved surface (a seat-side convexly curved surface) 35b which is convex toward the valve seat portion 26 side. The curved surface 35b is provided with an upstream-side curved surface 36 and a downstream-side curved surface 37 which are different from each other in radius of curvature. In the curved surface 35b, an intermediate portion 35d is provided at a predetermined position between an inner periphery-side end portion (a starting end portion) 35c and the outer periphery-side end portion 35a.

The upstream-side curved surface 36 is a curved surface from the inner periphery-side end portion 35c to the intermediate portion 35d. The cross section along the flow direction of the steam in the upstream-side curved surface 36 is formed with a radius of curvature R2. The downstream-side curved surface 37 is a curved surface from the intermediate portion 35d to the outer periphery-side end portion 35a. The cross section along the flow direction of the steam in the downstream-side curved surface 37 is formed with a radius of curvature R1.

In the seat portion 35, an abutting area 35s abutting the valve seat portion 26 is set within the range of the downstream-side curved surface 37.

In a steam valve, in the case of a structure in which the radius of curvature of a curved surface of a seat portion is smaller than the radius of curvature of a valve seat portion, an annular flow in which steam stably flows along the inner peripheral surface of a valve chamber from the valve seat portion is created. In the annular flow, the disturbance of a steam stream is not directly transmitted to a valve body, and therefore, the occurrence of self-excited vibration or noise is reduced. However, due to the structure in which the radius of curvature of the curved surface of the seat portion is smaller than the radius of curvature of the valve seat portion, at the time of a fully closed state, Hertz surface pressure (stress) is increased in the seat portion, and thus there is a concern that cracks may be generated in the seat portion.

Therefore, in the steam valve 10 of this embodiment, a structure in which it is possible to further reduce the occurrence of self-excited vibration or noise is provided. In this structure, in order to make it possible to prevent the occurrence of cracks in the seat portion, setting is made so as to satisfy the relational expressions of (1) to (9) which will be described later.

In the steam valve 10 of this embodiment, the upstream-side curved surface 36 having the radius of curvature R2 and the downstream-side curved surface 37 having the radius of curvature R1 are formed in the curved surface 35b of the seat portion 35. When the radius of curvature of a circle of curvature (hereinafter referred to as an average radius of curvature) passing through two points, the inner periphery-side end portion 35c and the outer periphery-side end portion 35a, is set to be Rv and the radius of curvature of the valve seat portion 26 is set to be Rs, the average radius of curvature Rv and the radius of curvature Rs are set so as to satisfy the relationship of Rv<Rs . . . (1).

In particular, it is preferable that the average radius of curvature Rv and the radius of curvature Rs are set to be within a range of 1.20≤Rs/Rv≤1.25 . . . (2).

In the curved surface 35b of the seat portion 35, the radius of curvature R1 of the downstream-side curved surface 37 which includes the abutting area 35s is set so as to satisfy the relationship of Rs<R1 . . . (3) with respect to the radius of curvature Rs of the valve seat portion 26.

In particular, it is preferable that the radius of curvature R1 is set to be within a range of 0.65≤Rs/R1≤0.70 . . . (4).

Further, in the curved surface 35b of the seat portion 35, the radius of curvature R1 of the downstream-side curved surface 37 is set so as to satisfy the relationship of R2<R1 . . . (5) with respect to the radius of curvature R2 of the upstream-side curved surface 36.

In the steam valve 10 of this embodiment, by forming the upstream-side curved surface 36 and the downstream-side curved surface 37 which are different from each other in radius of curvature, it is possible to set the radius of curvature Rs of the valve seat portion 26 such that the average radius of curvature Rv satisfies the relational expression (1) or the relational expression (2). The relational expression (1) or the relational expression (2) is satisfied, whereby the steam flowing from the annular flow path which is formed between the seat portion 35 and the valve seat portion 26 becomes an annular flow stably flowing along the inner peripheral surface 21a from the valve seat portion 26 side. In particular, even if the steam valve 10 is in the slightly open state, the annular flow is created, and thus it is possible to reduce flow along the valve body 30. For this reason, in the steam valve 10 of this embodiment, it is possible to prevent disturbance of a steam stream from being directly transmitted to the valve body 30, and therefore, it is possible to more reliably reduce self-excited vibration or noise of the valve body 30.

Further, in the steam valve 10 of this embodiment, by forming the upstream-side curved surface 36 and the downstream-side curved surface 37, it is possible to set the respective radii of curvature. In addition, by setting the radius of curvature R1 of the downstream-side curved surface 37 so as to satisfy the relational expression (3) or the relational expression (4), it is possible to reduce Hertz surface pressure (stress) in the seat portion 35 when the steam valve 10 is in the fully closed state. For this reason, in the steam valve 10 of this embodiment, it is possible to suppress occurrence of cracks of the seat portion 35 (the downstream-side curved surface 37 in which the abutting area 35s abutting the valve seat portion 26 is set).

Further, by setting the radius of curvature R1 of the downstream-side curved surface 37 and the radius of curvature R2 of the upstream-side curved surface 36 so as to satisfy the relational expression (1) or the relational expression (2), it is possible to reduce the average radius of curvature Rv of the seat portion 35.

Here, in order to make the steam flowing from the annular flow path which is formed between the seat portion 35 and the valve seat portion 26 become the annular flow, thereby making the effect of reducing self-excited vibration or noise of the valve body 30 significant, it is preferable that the radius of curvature R2 of the upstream-side curved surface 36, the radius of curvature R1 of the downstream-side curved surface 37, the average radius of curvature Rv in the curved surface 35b of the seat portion 35, and the radius of curvature Rs of the valve seat portion 26 are set so as to satisfy the relationship of R2<Rv<Rs<R1 . . . (6).

In this way, in the steam valve 10, it becomes possible to further reduce noise or vibration.

Next, the dimensional relationship of the steam valve 10 of this embodiment will be described.

In the valve head portion 31 of the valve body 30, when the diameter in the inner periphery-side end portion 35c of the seat portion 35 is set to be Din and the diameter in the abutting area 35s set in the downstream-side curved surface 37 is set to be Ds, the valve head portion 31 is formed so as to satisfy the relationship of Din/Ds≤0.75 . . . (7).

Further, when the inner diameter (throat diameter) of the inflow port 22 is set to be Dt, the diameter Ds in the abutting area 35s of the seat portion 35 is formed so as to satisfy the relationship of 1.15≤Ds/Dt≤1.25 . . . (8).

In this way, it is possible to regard an area A1 on the upstream side in the steam flow direction with respect to the abutting area 35s as a Laval nozzle in which the flow path cross-sectional area gradually reduces in the flow direction of the steam, and it becomes possible to sufficiently and smoothly reduce the pressure of the steam in the area A1.

Further, in the valve head portion 31 of the valve body 30, when the diameter in the outer periphery-side end portion 35a is set to be Dout, the diameter Ds of the abutting area 35s of the seat portion 35 is set so as to satisfy the relationship of 1.02≤Dout/Ds≤1.03 . . . (9).

Here, it is necessary to make the value of Dout/Ds greater than or equal to 1. However, for example, in a case where the value of Dout/Ds is about 1.01 which is smaller than a value in the above-described range, a flow path length between the seat portion 35 and the valve seat portion 26 after the abutting area 35s is too short, and therefore, the flow of the steam reaches the outer periphery-side end portion 35a while it is not stable. For this reason, when the flow path cross-sectional area rapidly expands at the outer periphery-side end portion 35a, the flow of the steam is stuck to the valve head portion 31 side and detached from the valve seat portion 26, whereby the flow of the steam sometimes becomes unstable. Further, in a case where the value of Dout/Ds is about 1.10 which is greater than a value in the above-described range, when the differential pressure of the flow of the steam which is compressed between the seat portion 35 and the valve seat portion 26 is close to the critical differential pressure, a shock wave generated in the abutting area 35s is stuck to the seat portion 35, and thus the flow of the steam sometimes becomes unstable.

In contrast, if the relationship of the relational expression (9) is stratified, it is possible to make the abutting area 35s, that is, the distance from a position where the cross-sectional area of the annular flow path between the seat portion 35 and the valve seat portion 26 becomes the smallest when the valve body 30 is in the open state, to the outer periphery-side end portion 35a where the tapered portion 38 is formed, as short as possible even while stabilizing the flow of the steam. In this way, in the steam valve 10 of this embodiment, even in the slightly open state, when the flow of the steam reaches the outer periphery-side end portion 35a, the flow of the steam is favorably separated from the valve body 30 side, thereby becoming an annular flow along the valve seat portion 26.

Here, since the tapered portion 38 is formed on the downstream side of the outer periphery-side end portion 35a of the seat portion 35, a flow path cross-sectional area rapidly expands due to the tapered portion 38. Also due to this, the flow of the steam is favorably separated from the valve body 30 side, thereby becoming an annular flow along the valve seat portion 26.

Other Embodiments

In addition, the steam valve according to the present invention is not limited to the above-described embodiment described with reference to the drawings, and various modified examples are considered within the technical scope thereof.

For example, with respect to the overall configuration of the steam valve 10 and the position and the use of the steam valve 10 in a steam pipeline of a steam turbine, any type may be adopted as long as it is within the scope of the present invention.

Further, for example, the positional relationship between the inflow port 22 and the outflow port 23 in the steam valve 10, a mechanism for driving the valve body 30 by an actuator, and the shape or the like of the valve body 30 other than the valve head portion 31 may be appropriately made as other configurations.

In addition to this, as long as it does not depart from the gist of the present invention, it is possible to choose the configurations illustrated in the above-described embodiment or appropriately change them to other configurations.

INDUSTRIAL APPLICABILITY

The present invention can be widely applied to a steam valve which is provided with a casing with a steam flow path formed therein, and a valve body disposed in the steam flow path and provided so as to be able to move relative to the steam flow path.

REFERENCE SIGNS LIST

10: steam valve
20: casing
21: valve chamber
22: inflow port
23: outflow port
24: opening portion
25: holding member
26: valve seat portion
26a: curved surface (valve-seat-side convexly curved surface)
29: steam flow path
30: valve body
31: valve head portion 35: seat portion
35a: outer periphery-side end portion (termination end portion)
35b: curved surface (seat-side convexly curved surface)
35c: inner periphery-side end portion (starting end portion)
35d: intermediate portion
35s: abutting area
36: upstream-side curved surface
37: downstream-side curved surface
38: tapered-shaped portion
39: enlarged diameter portion
40: valve shaft

The invention claimed is:

1. A steam valve comprising:
a casing with a steam flow path formed therein;
a valve body disposed in the steam flow path and provided so as to be capable of moving relative to the steam flow path;
a valve seat portion which is formed in the steam flow path and provided with a valve-seat-side convexly curved surface having a cross-sectional area gradually increasing toward a downstream side in a flow direction of steam in the steam flow path; and
a seat portion which is formed in the valve body and has, at a site facing the valve seat portion, a seat-side convexly curved surface having an outer diameter gradually increasing toward the downstream side from an upstream side in the flow direction of the steam, wherein
in the seat-side convexly curved surface, an average radius of curvature Rv in the flow direction from a starting end portion on the upstream side in the flow direction of the steam to a termination end portion on the downstream side in the flow direction of the steam has a relationship of Rv<Rs with respect to a radius of curvature Rs in the flow direction of the steam of the valve-seat-side convexly curved surface,
the seat-side convexly curved surface is provided with an upstream-side curved surface on the upstream side in the flow direction of the steam, and a downstream-side curved surface on the downstream side in the flow direction of the steam, the upstream-side curved surface and the downstream-side curved surface having radii of curvature different from each other,
the downstream-side curved surface has an abutting area abutting the valve seat portion, and
a radius of curvature R1 of the downstream-side curved surface that extends in the flow direction of the steam has a relationship of Rs<R1 with respect to the radius of curvature Rs in the flow direction of the steam.

2. The steam valve according to claim 1, wherein
the valve body is provided with a tapered portion which is continuously formed from the termination end portion of the seat portion and formed at the downstream side of the seat portion in the flow direction and which has an outer diameter which is gradually reduced.

3. The steam valve according to claim 1, wherein
a radius of curvature R2 of the upstream-side curved surface that extends in the flow direction of the steam, the radius of curvature R1 of the downstream-side curved surface, and the average radius of curvature Rv of the seat portion have a relationship of R2<Rv<Rs<R1 with respect to the radius of curvature Rs of the valve seat portion.

4. The steam valve according to claim 1, wherein
a diameter Ds of the abutting area of the seat portion with respect to a center of the valve body and a diameter Dout of the termination end portion of the seat portion have a relationship of 1.02≤Dout/Ds≤1.03.

5. The steam valve according to claim 1, wherein
the diameter Ds of the abutting area of the seat portion and a diameter Din of the starting end portion of the seat portion have a relationship of Din/Ds≤0.75.

6. The steam valve according to claim 1, wherein
the diameter Ds of the abutting area of the seat portion and an inner diameter Dt of the steam flow path on the upstream side in the flow direction with respect to the valve seat portion have a relationship of 1.15≤Ds/Dt≤1.25.

* * * * *